US005816283A

United States Patent [19]

Ostand

[11] Patent Number: 5,816,283

[45] Date of Patent: Oct. 6, 1998

[54] TANK BLANKETING SYSTEM

[75] Inventor: Paul R. Ostand, Sissonville, W. Va.

[73] Assignee: Appalachian Controls Environmental, South Charleston, W. Va.

[21] Appl. No.: 831,081

[22] Filed: Apr. 1, 1997

[51] Int. Cl.[6] .................................................... G05D 16/06

[52] U.S. Cl. .......................... 137/209; 137/102; 137/489

[58] Field of Search .................................... 137/102, 209, 137/489, 557

[56] References Cited

U.S. PATENT DOCUMENTS

| | | |
|---|---|---|
| 843,174 | 2/1907 | Reynolds . |
| 1,982,045 | 11/1934 | Clithero et al. . |
| 2,707,970 | 5/1955 | Hughes . |
| 3,132,659 | 5/1964 | Kenyon . |
| 3,414,008 | 12/1968 | Greenwood . |
| 3,477,456 | 11/1969 | Powell . |
| 3,592,224 | 7/1971 | Bois . |
| 3,858,598 | 1/1975 | Carman et al. . |
| 4,180,238 | 12/1979 | Muchow . |
| 4,226,263 | 10/1980 | Muchow . |
| 4,245,663 | 1/1981 | Solowy . |
| 4,274,440 | 6/1981 | Richard, Jr. . |
| 4,312,375 | 1/1982 | Leinemann . |
| 4,386,756 | 6/1983 | Muchow . |
| 4,402,341 | 9/1983 | Reip . |
| 4,425,938 | 1/1984 | Papa et al. . |
| 4,471,810 | 9/1984 | Muchow et al. . |
| 4,991,620 | 2/1991 | Ligh . |
| 5,067,522 | 11/1991 | Ligh . |
| 5,072,749 | 12/1991 | Ligh . |
| 5,094,267 | 3/1992 | Ligh . |
| 5,131,424 | 7/1992 | Heidorf et al. . |
| 5,443,090 | 8/1995 | Ligh . |
| 5,474,351 | 12/1995 | Ligh . |
| 5,511,581 | 4/1996 | Ligh . |

OTHER PUBLICATIONS

Vacu–Gard® Tank Blanketing Valves, 1993 Brochure.
Groth Tank Protection Products “Groth Model 3000 Series Blanket Gas Regulater” Brochure (Undated).
Anderson, Greenwood & Co., Making Technology Perform “Agco® Tank Blanketing Regulator System” Dec. 1989.
Shand & Jurs Tank Fittings & Gauging, “Model 94270 Tank Blanketing Valve” Instruction Manual (Undated).
Series No. 20, Tank Blanketing . . . a Versatile Tool for Fire & Explosion Prevention, Brochure (Undated).
Bellofram, “The Rolling Diaphragm” 1992 Design Manual.
Intech, Feb. 1994, p. 10.

*Primary Examiner*—Gerald A. Michalsky
*Attorney, Agent, or Firm*—Jacobson, Price, Holman & Stern, PLLC

[57] ABSTRACT

A tank blanketing system protects both the tank vapor space and the environment. A pad valve supplies inert gas to the vapor space and maintains the pressure in the vapor space under conditions that tend to reduce the pressure in the vapor space. Should the pressure rise a predetermined amount above the setting of the pad valve, a depad valve will open to vent vapors so as to return the pressure in the vapor space to its designed operating range. The depad valve is connected to a recovery piping system that will route the vapors to an appropriate device that processes or disposes of them in a predetermined manner.

19 Claims, 3 Drawing Sheets

TANK BLANKETING SYSTEM

FIELD OF THE INVENTION

The present invention includes a system of valves that provide a blanketing gas, such as an inert gas, to a storage tank or the like. In addition to providing and supplying a pressurized inert gas blanket, the system also has the ability to relieve excess gas pressure from the storage tank.

BACKGROUND OF THE INVENTION

Tank blanketing is an effective way to prevent fires in storage tanks which contain flammable liquids. Tank blanketing prevents the formation of an explosive vapor/air mixture. A blanket or pad of inert gas in a vapor space inside a tank prevents atmospheric air from entering the tank. In addition to preventing outside air, which contains oxygen, moisture and other contaminants from entering the tank, the blanket also minimizes evaporation of the stored product to reduce product emission levels.

The blanketing gas, usually an inert gas such as nitrogen, is injected as necessary, into the vapor space in the tank to maintain an inert atmosphere. The blanket pressure is usually very low (less than 1 PSI).

The inert gas is admitted only during inbreathing cycles (vacuum cycles). An inbreathing cycle occurs when liquid is being withdrawn from a tank, or when vapors condense in a tank due to a decrease in temperature. The amount of inert gas required for a specific application is based on the maximum inbreathing demand under conditions of sudden cooling, caused by weather conditions, and the emptying rate of the tank.

Although nitrogen is most commonly used, other gases, including natural gas or other non-inert gases, may be used in some applications. Depending upon the specific application, the selection of a blanketing gas for a particular process is based upon at least one of the following characteristics:

1. Non-flammable in the desired atmosphere
2. Non-interacting with the tank liquid
3. Chemically inactive
4. Non-toxic
5. Availability in large quantities
6. Economic factors In designing a tank blanketing system, several considerations are evaluated:

1. The tanks themselves as well as the piping, dikes, fittings, etc., should be designed and constructed in accordance with sound engineering principles.
2. Blanketing gas or tank blanketing equipment must be completely reliable and capable of maintaining an adequate supply of gas at all times. Equipment breakdown or equipment that is inadequately sized for the job will result in a higher oxygen concentration in the vapor space of the storage tank which would mix with the vapors resulting in a potentially flammable mixture.
3. The blanketing gas should be introduced into the tank so that it is distributed effectively.
4. Contamination of the blanketing gas from any source must be guarded against. Suitable devices should be employed to hold moisture to an absolute minimum.

A blanketing valve is used in tank blanketing applications to regulate the pressure of the blanketing gas layer on top of a tank liquid. The valve senses the pressure of the tank blanket and opens to allow flow in of more blanketing gas when pressure drops below a set pressure. The valve closes and stops flow when pressure builds back up to the set pressure in the tank.

One example of a tank blanketing valve is disclosed in U.S. patent application Ser. No. 08/580,333, commonly assigned to Appalachian Controls Environmental. In this application a pilot controlled blanketing valve senses tank pressure on the underside of a diaphragm of an actuator. The diaphragm directly actuates a pilot valve. Flow of gas through the pilot valve is directed to the tank being blanketed. Gas flowing through the pilot valve causes the pressure to drop in a sealed chamber above a main valve piston also included in the blanketing valve.

When the pressure has dropped sufficiently, the main valve opens to a throttling position and allows blanketing gas to flow into the tank in combination with gas flow through the pilot valve. When the pressure is restored in the tank, the diaphragm actuator allows the pilot to close. Pilot flow ceases and restores the pressure above the main valve piston to full inlet pressure, shutting off the main valve.

Blanketing gas is directed to the main valve inlet and to the externally mounted pilot filter. The main valve and pilot valve are both normally closed. There is no gas flow through these valves if the tank pressure is at or above setpoint.

The main valve is primarily a piston that has a diameter larger than the diameter of the gas inlet orifice. This piston is in a sealed chamber that is at inlet gas pressure when the tank pressure is at or above setpoint. Since the area of the piston is larger than the inlet orifice area, the net effect is that the main valve is tightly sealed by inlet pressure.

The upper side of the diaphragm actuator is spring loaded by a range spring. The range spring is adjusted to obtain the desired tank pressure. The downward force of the range spring on the upperside of the diaphragm is opposing the force of the pressure from the tank on the underside of the same diaphragm. When the tank pressure is at or above setpoint, the diaphragm is urged upward, against the spring. If the tank pressure should fall below the setpoint, the spring moves the diaphragm down. This downward motion opens the pilot valve.

The pilot valve is actuated by the diaphragm actuator engaging a poppet of the pilot valve which is normally closed against the pilot valve seat. Inlet gas is supplied to the pilot valve through an orifice located in a bonnet. A rolling diaphragm in the pilot valve fully balances the pressure forces across the pilot poppet. The inlet pressure to the pilot acts against the underside of the poppet and the upper side of the rolling diaphragm.

Full balancing of forces is essential if the pilot valve is not to be unduly influenced by changes in inlet pressure. Regardless of the inlet pressure, the pressure forces across the pilot valve are in balance. A bias spring in the pilot urges the pilot upward to allow the pilot poppet to move up with the diaphragm. It also provides a seating force to shut-off pilot flow.

When the tank conditions are such that the tank pressure is at or above the desired pressure (set-point) there will be no gas flow through the unit. If the tank pressure falls just slightly below the setpoint, the pilot valve will open and try to maintain the tank pressure. Should the tank pressure fall further, the pilot will open further in an attempt to satisfy the tank demand. Finally, the pilot will cause the main valve to open and satisfy the tank demand.

The main valve is controlled by the pilot in the following manner. As gas passes through the external pilot filter, it flows through the pilot inlet orifice to the pilot inlet chamber. As the gas flows through the orifice, its pressure drops. The greater the flow through the pilot inlet orifice, the further the pressure drops. The pressure in the pilot inlet chamber is transmitted through an internal passage to a sealed piston chamber above the main valve. Since this main valve chamber is of larger area than the main valve inlet orifice, the main valve will act to close and shut off the main valve inlet orifice as long as inlet pressure forces the main valve tightly into the main valve orifice.

As the pressure drops in the pilot inlet chamber, it also drops in the main valve piston chamber. When it drops sufficiently, the down-force created by this pressure on the larger piston area becomes less than the up force created by the inlet pressure acting on the main valve seat at the main valve orifice. Accordingly, the main valve opens and allows flow from the valve inlet to the tank.

Another example of a pressure control system is shown in U.S. Pat. No. 5,131,424, also herein incorporated in its entirety by reference.

SUMMARY OF THE INVENTION

Accordingly, it is an object of the present invention to maintain a tank vapor space at some predetermined pressure.

As previously stated, the vapor space of a storage tank pressurized with a gas will prevent the ingress of atmospheric air which contains oxygen and water vapor. Also, the vapor space pressurized with a gas will dilute the concentration of vapors of stored material in the vapor space of the storage tank. The presence of inert gas instead of atmospheric air will provide protection against the ignition of flammable vapors by lowering the concentration of oxygen to below a lower explosive limit.

The pressure in the vapor space will vary because of several factors. In addition to dealing with a decrease in vapor space pressure, it is an object of the present invention to remedy an increase in vapor space pressure. One of the causes of an increased tank pressure, is the adding of liquid to the tank. In addition, variations in atmospheric conditions including temperature changes, rain, and sunlight will also increase as well as decrease the vapor space pressure.

The present invention uses a single diaphragm actuator to sense a tank pressure and operate both a gas supply valve (also referred to as a "pad" valve) and a gas venting valve (also referred to as a "depad valve") to remedy both over-pressurization and under-pressurization of a tank vapor space. Further, a rolling diaphragm is used in the actuator since a rolling diaphragm has unique stroke capabilities. Also, a single spring is used to adjust the "pad" pressure setpoint. A deadband above the pad setpoint is independently adjustable to thereby set the "depad" pressure setpoint.

Tanks that are not equipped with pad or depad provisions are normally equipped with atmospheric vents that protect the tank's structural integrity by limiting the pressure and the vacuum in the vapor space. These arrangements, however, do not control the content of the vapor space, and do not prevent ingress of atmospheric air or prevent venting of the vapor space contents to the atmosphere.

The present invention protects both the tank vapor space and the environment. A pad valve supplies inert gas to the vapor space and maintains the pressure in the vapor space under conditions that tend to reduce the pressure in the vapor space. Should the pressure rise a predetermined amount above the setting of the pad valve, a depad valve will open to vent vapors so as to return the pressure in the vapor space to its designed operating range. The depad valve is connected to a recovery piping system that will route the vapors to an appropriate device that processes or disposes of them in a predetermined manner. The operation of the depad valve is independent of any differential pressure that may occur across the depad main valve.

According to the present invention, a first tank fitting is provided to communicate with a vapor space located above the liquid in a storage tank. This fitting is used to provide a connection to both allow blanketing gas into the tank from the pad valve and to provide a pressure relief path through the depad valve to relieve the pressure in the vapor space. A second tank fitting is used to sense the pressure in the vapor space.

Pressurized blanketing gas is supplied to the pad valve and to an inlet connection on a pilot valve. While blanketing gas is shown to operate the pilot and depad main valve, a separate source of pressurized gas could be used. The pad valve is located on one side of the diaphragm actuator and the pilot valve is located on the opposite side of the diaphragm actuator. The second tank fitting is connected to the valve actuator for sensing tank pressure.

An inlet of the depad valve is connected to one arm of the tee-shaped connection forming the first tank fitting. The pad valve is connected to the other arm of the tee-shaped connection of the first tank fitting. An outlet of the depad valve is connected to a facility vapor recovery pipe.

Accordingly, the pad valve is actuated upon sensing of a low pressure in the tank vapor space to supply blanketing gas thereto. If a high tank pressure is sensed, the depad valve is moved from a closed position to an open position to allow passage of excess gas pressure to a vapor recovery facility. These two functions are accomplished by the single system of the present invention.

It is therefore another object of the present invention to provide a tank blanketing system having a pad valve, a diaphragm actuator and a pad pilot valve used in combination with a depad valve to control pressure in a vapor space of a storage tank.

It is another object of the present invention to provide a tank blanketing system that uses a rolling diaphragm in a diaphragm actuator to control the pad valve and pad pilot valve by movement of the diaphragm.

It is another object of the present invention to provide a tank blanketing system which is adjustable to change both a pad pressure set point and a deadband between pad and depad set points by the use of a single spring and an independent adjustment to change the depad pressure setpoint and the deadband without affecting the pad pressure setpoint.

It is yet another object of the present invention to provide a pad-depad system where the depad setpoint is not changed by a differential pressure across the depad main valve.

It is still yet another object of the present invention to provide a compact assembly which is fittable onto a storage tank so as to maintain the pressure in a tank vapor space at or above a minimum value and at or below a maximum value through a single tank fitting with excess vapor pressure being transferred to a vapor recovery outlet for processing or disposal.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
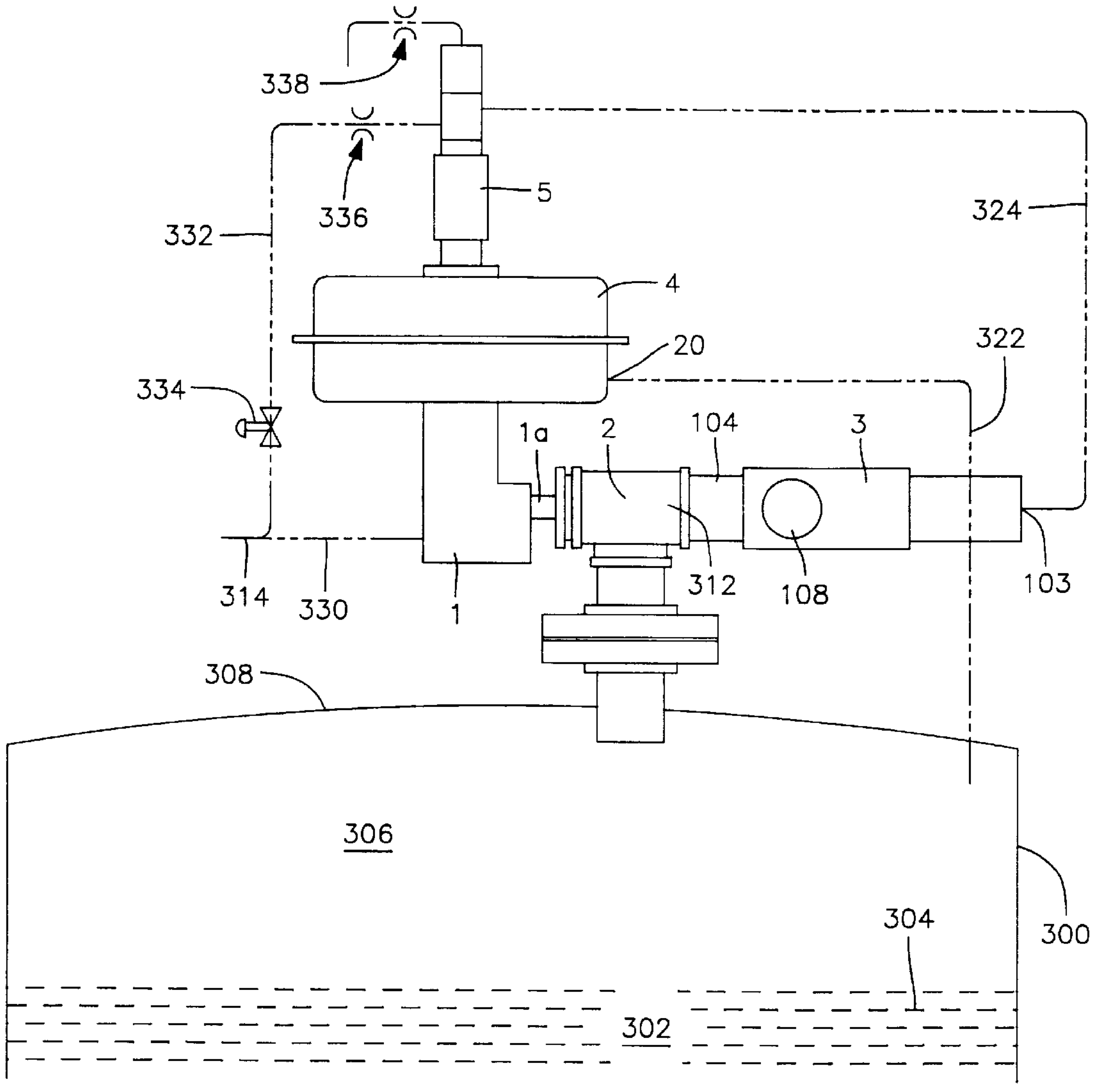
FIG. 1 is a schematic representation of a storage tank having a tank blanketing system according to the present invention which allows for both inert gas supply to a tank vapor space as well as inert gas venting in the event of over-pressurization of the tank vapor space.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

In FIG. 1, a design layout of the present invention is schematically shown. A storage tank 300 includes a liquid 302 to a level 304, above which is a tank vapor space 306 limited by the top 308 of the tank.

A first tank fitting 2 is T-shaped and includes arms 310 and 312. A pad valve 1 is connected to arm 310 to supply inert gas to the tank 300 through passage la due to an under-pressurization of the tank.

Over-pressurization of the tank is released through arm 312 and pipe 104 through depad valve 3. Depad valve 3 includes an outlet 108 to a vapor recovery system as well as a port 103 connected to pipe 324.

Located above pad valve 1 is the diaphragm actuator 4. Depad pilot valve 5 is located on the opposite side of the diaphragm actuator 4. Blanketing gas is supplied to the pad valve 1 and depad pilot valve 5 from pressurized inert gas supply 314 and lines 330 and 332, respectively. A pressure regulating valve 334 and a restricting orifice 336 is located in line 332.

Figure 2:
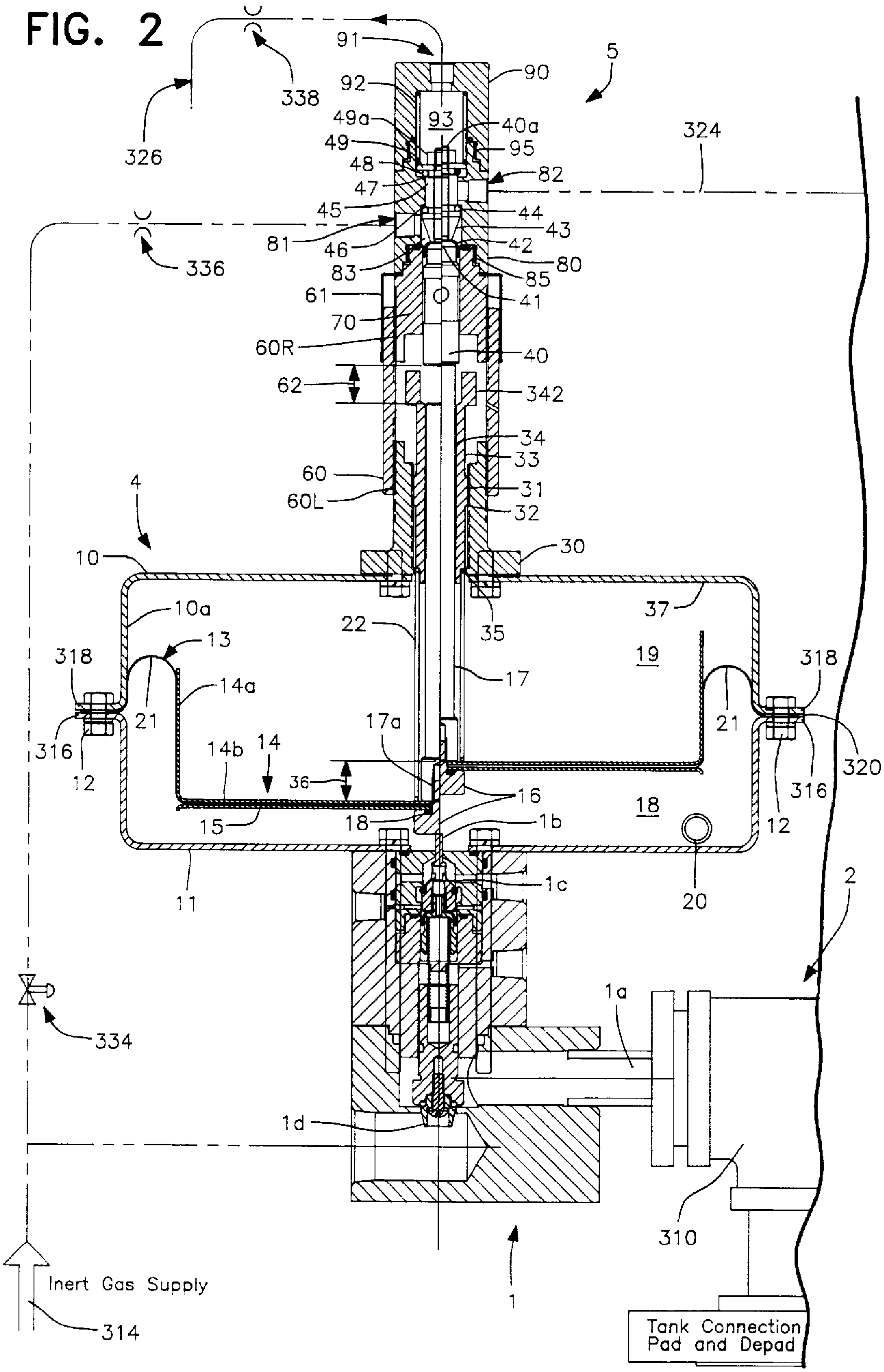
FIG. 2 is a detailed view of a portion of the tank blanketing system of the present invention as connected to one side of a tank connection fitting. A diaphragm actuator is shown in two different positions in the left and right sides of the Figure indicative of different gas pressures being supplied to an area below the diaphragm and the relative positioning of the single diaphragm and the pilot valve components as affected by the movement up and down of the single diaphragm.

With reference to FIG. 2, actuator 4 includes an upper housing 10, and a similar lower housing 11 fastened together by matching flanges 316, 318, respectively, having bolts 12 securing the flanges together.

Flanges 316, 318 also clamp an outer flange 320 of a rolling diaphragm 13. The rolling diaphragm is supported by a deep flanged, upper diaphragm plate 14. Flange 14*a* of plate 14 extends perpendicular to a lower, flat plate portion 14*b* of plate 14. Flange 14*a* along with inner wall 10*a* of the upper housing form inner and outer operating surfaces for the rolling diaphragm 13. These surfaces define an area represented by a difference in diameter of the flange 14*a* and the inner wall boa of the upper hosing. This is the effective area diameter of a rolling portion 21 of the rolling diaphragm 13. Due to the construction of the housing 10 and its internal components, the size of the area through which rolling portion 21 moves is constant. The area does not vary as the diaphragm moves from one position to another.

The diaphragm 13 is clamped in position between flat plate portion 14*b* of the upper diaphragm plate 14 and a flat lower diaphragm plate 15. The plates 14, 15 are secured by a centrally located sealing bolt 16 passing through the plates. The bolt includes external threads for engaging internal threads 17*a* of an elongated stem 17. An O-ring 18 seals the diaphragm, preventing communication of vapor between volume spaces 18 and 19 in the housing, located below and above, respectively, the diaphragm. Likewise, clamping the diaphragm between the plates 14 and 15 seals against leakage between volumes 18 and 19.

Lower volume space 18 is in communication with the tank vapor space 306 via a sensing line 322 connected to port 20. Upper volume space 19 is at atmospheric pressure.

When the lower volume 18 is pressurized due to pressure from tank vapor space 306, the pressure acts over an effective area of the rolling portion 21 of the rolling diaphragm 13. The diaphragm will exert an upward force equal to the pressure times the effective area. This force is resisted by a downward spring bias force exerted by a helical compression spring 22 surrounding the stem 17 and engaging the upper diaphragm plate 14.

A rolling diaphragm is used because it is capable of long strokes, which enables a single actuator to provide pad setpoint, deadband, and depad setpoint. In addition, its effective area is constant and allows a linear response. Further, it is virtually frictionless and will not contribute to hysteresis.

In one position of the diaphragm, as shown in the right-hand side of FIG. 2, due to pressure from the storage tank 300, the pad valve is closed, its pilot valve stem 17 located in its uppermost position. In this condition, there is no flow from the pad valve to the tank. Neither the pilot valve 1*c* or the main valve 1*d* of the pad valve are open. In this condition there is a preload force applied to the spring 22.

The preload force on spring 22 is adjustable. Flanged tower support 30 has an internally threaded portion 31 which is threadably engaged with the mating threads 32 on spring adjuster 33.

A formed seating surface 35 engages the upper end of spring 22. The lower end of the spring rests against the surface of upper diaphragm plate 14 and is centrally guided by stem 17. Rotating the collar 342 on the end of adjuster 33 to move the adjuster 33 vertically up or down, causes the seating surface 35 of the spring adjuster to move correspondingly vertically, up or down, and to further compress or extend the installed height of the spring 22, thereby increasing or decreasing its compression load and the set-point for opening of the pad valve 1. This force has been previously described as defining the pressure at which the upper diaphragm plate will begin to move upward.

When the pressure in the tank vapor space is above the compression load pressure, the pad valve is closed (as previously described). When the tank vapor space pressure falls below this pressure, the spring force will be larger than the force defined by the vapor space pressure times the effective diaphragm area and the upper diaphragm plate will move down. The downward motion will depress the stem 1*b* and cause inert gas to flow through the pad valve 1 into tee arm 310 through pipe la and into the tank vapor space 306.

Should the pressure in the tank rise, that pressure will cause the upper diaphragm plate 14 to move upward, compressing the spring 22, and increasing its load until it balances the diaphragm force (pressure times the effective diaphragm area).

The diaphragm actuator 4 has a stroke capacity distance 36 limited by the constraint of the upper diaphragm plate flange 14*a* contacting the interior surface 37 of upper housing 10. This distance can be used to calibrate a "deadband" into the operation.

As illustrated the stroke capacity distance 36 is less than the maximum available. This is because as the diaphragm moves upward, the stem 17 moves with the diaphragm. The stem is guided by the bore 34 extending centrally through the spring adjuster 33.

The depad pilot valve 5 is located above the stem 17. A follower 40 of the valve 5 is separated by an adjustable distance 62 equal to the deadband.

The pilot valve 5 has a follower 40 which has a formed portion 41 and a threaded extension 40*a*. The formed section 41 maintains a small rolling diaphragm 42 in place. The threaded extension 40*a* extends through the rolling diaphragm and locates a poppet 43, O-ring 44, and seal retainer 49 in place. Seal retainer 49 has a cylindrical portion 49*a* which is threaded to mate with the threads on threaded extension 40*a* thereby making a complete pilot poppet assembly.

This assembly is contained within the lower cage 70, center cage 80 and upper cage 90. The cages are threaded together at 85 and 95. A spring 92 is contained within the upper cage and urges the pilot poppet assembly downward. In the position shown in the left side of FIG. 2, the O-ring 48 is seated against the seat 47 in the center cage 80. O-ring 44 is unseated in the left side of FIG. 2, being displaced down and away from its seat 46.

In this position, there is a passage open from blanketing gas inlet 81, past O-ring 44, around poppet body 45 to "cyl" connection 82. The passage is closed from cyl connection 82 to vent passage 91 by O-ring 48.

Chamber 83 is formed by the rolling diaphragm 42 and O-ring 44. The effective sealing areas of each of these elements is identical. Therefore, regardless of what pressure might be in chamber 83 there is no force transmitted up or down, due to this pressure, because the valve is balanced. This is important because any change in force would change the operating points of the unit by introducing an additional force, up or down. Therefore a balanced pilot valve operates the depad main valves, just as in the pad valve 1.

A sleeve coupling 60 connects the tower 30 to the lower cage 70 by threaded sections 60L and 60R. These sections are respectively threaded with left hand and right hand threads. Rotating coupling 60 about the vertical axis, will either move the follower 40 closer to or further away from the end of stem 17. This increases or decreases distance 62. In this manner the deadband, and the operating point for the depad valve are adjusted.

By rotation of coupling 60, the deadband adjustment does not affect the pad setpoint adjustment. The relationship is:

Depad Setpoint=Pad setpoint+Deadband

Figure 3A:
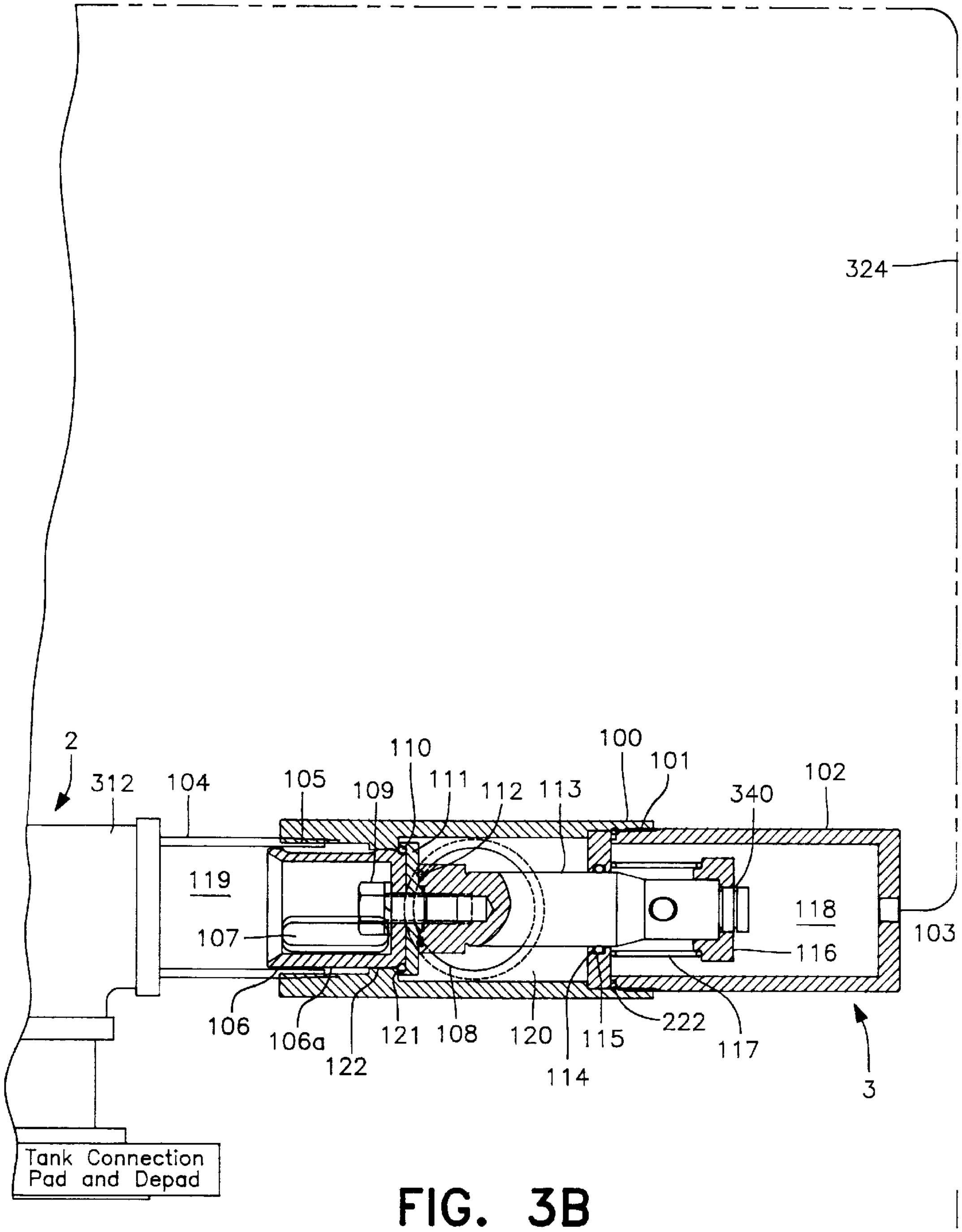
FIGS. 3A is a detailed view of the remaining portion of the tank blanketing system, not shown in FIG. 2, connected to another arm of the same tank connection fitting as shown in FIG. 2 with the depad valve shown in FIG. 3A in a closed position.
Figure 3B:
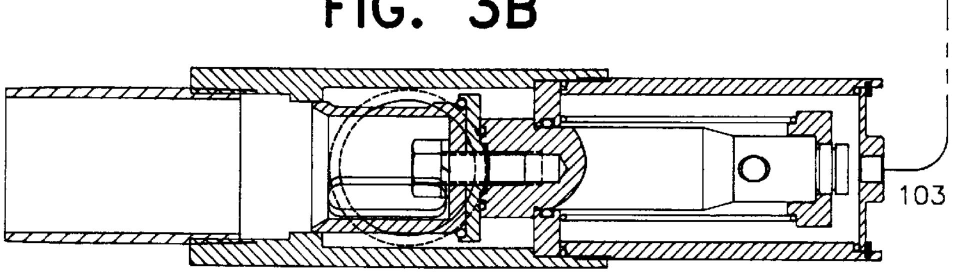
FIG. 3B is a detailed view of the depad valve which is intended to represent the same depad valve as shown in FIG. 3A, but illustrating an open position of the depad valve.

The depad valve 3 is shown in a closed position in FIG. 3A and shown in an open position in FIG. 3B. The depad main valve 3 consists of a body 100 having a threaded portion 101 which allows the cylinder 102 to be threadably engaged to the body. The cylinder 102 has a connection 103 which is connected by tubing 324 to the cyl connection 82 on the pilot valve. The other end of the body 100 has a threaded portion 105 which connects pipe 104 to the body. Pipe 104 is connected to arm 312 of fitting 2 to allow passage of gas pressure through inlet 119 of the depad main valve.

A main valve element and guide 106 has one or more openings 107 which are throttling flow passages. The guide 106 is connected to the discholder 111 and stem 113 by fastener 109. O-rings 110 and 112 form seals between the inlet 119 and the body cavity 120 which is located downstream form inlet 119. O-ring 110 seats against body seat 121. Annulus 122 forms a bearing guiding surface for portion 106*a* on the main valve element 106.

Stem 113 slidably engages O-ring 115 which is mounted within a groove in baseplate 114 forming a seal between chamber 120 and chamber 118. The baseplate outer diameter is sealed by O-ring 222 which also seals chamber 118 from the outside of the cylinder (atmosphere).

Spring seat 116 is secured to the end of the stem by a retaining ring 340. A return spring 117 extends between the base plate 114 and spring seat 116. Spring 117 urges the valve to an open position (as shown in FIG. 3B) whenever chamber 118 is not pressurized. Pressure in chamber 118 drives the valve stem 113 which acts as a piston sealed by o-ring 115 to the left, closing the main valve by seating o-ring 110 against body seating surface 121 as shown in FIG. 3A.

In the open position there is a flow path from the tank, through arm 312 of fitting 2, inlet pipe 104, through opening (s) 107 into chamber 120 and out side-outlet 108. Side outlet 108 is connected to recovery piping to carry the vapors away to a safe location for processing or disposal.

In operation, when the tank pressure is at or below the pad set point, the stem 17 is down and the follower 40 is in its lowermost position, as shown on the left side of FIG. 2. There is a passage open from "in" inlet 81 to "cyl" connection 82, to port 103 and chamber 118 through pipe 324. Pressurized blanket gas supply 314 at inlet 81 pressurizes chamber 118 and maintains the depad main valve 3 in a closed position as shown in FIG. 3A. This closes the tank from the vent piping.

When the tank pressure increases enough to move the stem 17 upward into contact with follower 40, as shown in the right side of FIG. 2, moving O-ring 48 off of seat 47 and opening a passage from cyl connection 82 to chamber 93 and to atmosphere via vent 91. Alternatively, "vent" 91 can be piped by pipe 326 to the tank vapor space 306. An orifice 338 is located in pipe 326.

If the movement of stem 17 is small, the previously described passage from "in" inlet 81 remains open. In this position the pilot is throttling, and the pressure in chamber 118 will drop to an intermediate value, partially closing valve 106. The tank will thereby vent.

Should the tank pressure continue to increase to the point that the follower 40 moves upward enough that O-ring 44 contacts seat 46, the pressurized gas supply from inlet 81 will be closed off and all the gas in chamber 118 will be vented to atmosphere. Then spring 117 will drive the stem 113 to the right, causing valve 106 to open fully, allowing maximum venting of gas from the tank.

Conversely, should the tank pressure drop far enough, the actuator diaphragm will move down, the stem 17 following it. Follower 40 also follows the stem down until the O-ring 48 contacts seat 47 and O-ring 44 leaves seat 46. This allows pressurization of chamber 118 in the depad main valve 3 to close the main valve, and venting to cease.

The main valve 3 is a normally open valve. Should the inert gas supply fail, the main valve will be driven to its open position by the spring 117, thereby venting the tank to protect it.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A tank blanketing system for a storage tank, said tank blanketing system comprising:

a tank fitting for the storage tank, a pad valve connected to said tank fitting, a depad valve connected to said tank fitting, a diaphragm actuator connected to said pad valve, a depad pilot valve connected to said diaphragm actuator, a sensing port of said diaphragm actuator communicating with a vapor space in the storage tank, and at least one source of gas connected to said pad valve and to said depad pilot valve, said depad valve being in communication with said depad pilot valve for initiating opening of said depad valve to reduce pressurization of the vapor space upon detection of pressurization of the vapor space above a predetermined setpoint by said diaphragm actuator, said diaphragm actuator controlling said pad valve for increasing pressurization of the vapor space upon detection of pressurization of the vapor space below a predetermined setpoint by said diaphragm actuator.

2. A tank blanketing system as claimed in claim 1, wherein said tank fitting includes two arms, one of said two arms is connected to said pad valve and the other of said two arms is connected to said depad valve.

3. A tank blanketing system as claimed in claim 1, wherein said diaphragm actuator includes a rolling diaphragm for dividing an interior of a housing of said diaphragm actuator into two separate volume spaces.

4. A tank blanketing system as claimed in claim 3, wherein said sensing port is located in a lower one of said two volume spaces of said diaphragm actuator.

5. A tank blanketing system as claimed in claim 4, wherein said sensing port is connected to the vapor space of the storage tank by a sensing line.

6. A tank blanketing system as claimed in claim 1, wherein said depad pilot valve includes an adjustable portion for varying a setpoint of actuation of said depad valve without affecting a setpoint of actuation of said pad valve.

7. A tank blanketing system as claimed in claim 6, wherein a deadband between said setpoint of said depad valve and said setpoint of said pad valve is varied without affecting said setpoint of said pad valve.

8. A tank blanketing system as claimed in claim 1, wherein said depad pilot valve includes an adjustable portion for varying a setpoint for actuation of said pad valve.

9. A tank blanketing system as claimed in claim 8, wherein a deadband between a setpoint of said depad valve and said setpoint of said pad valve is varied without affecting said setpoint of said pad valve.

10. A tank blanketing system as claimed in claim 1, wherein a setpoint of said depad valve remains constant, independent of differential pressure across said depad valve.

11. A tank blanketing system for a storage tank, said tank blanketing system comprising:

a pad valve for communicating with the storage tank, a depad valve for communicating with the storage tank, a diaphragm actuator connected to said pad valve, a depad pilot valve connected to said diaphragm actuator, a sensing port of said diaphragm actuator communicating with a vapor space in the storage tank, and at least one source of gas connected to said pad valve and to said depad pilot valve, said depad valve being in communication with said depad pilot valve for initiating opening of said depad valve to reduce pressurization of the vapor space upon detection of pressurization of the vapor space above a predetermined setpoint by said diaphragm actuator, said diaphragm actuator controlling said pad valve for increasing pressurization of the vapor space upon detection of pressurization of the vapor space below a predetermined setpoint by said diaphragm actuator.

12. A tank blanketing system as claimed in claim 11, wherein said diaphragm actuator includes a rolling diaphragm for dividing an interior of a housing of said diaphragm actuator into two separate volume spaces.

13. A tank blanketing system as claimed in claim 12, wherein said sensing port is located in a lower one of said two volume spaces of said diaphragm actuator.

14. A tank blanketing system as claimed in claim 13, wherein said sensing port is connected to the vapor space of the storage tank by a sensing line.

15. A tank blanketing system as claimed in claim 11, wherein said depad pilot valve includes an adjustable portion for varying a setpoint of actuation of said depad valve without affecting a setpoint of actuation of said pad valve.

16. A tank blanketing system as claimed in claim 15, wherein a deadband between said setpoint of said depad valve and said setpoint of said pad valve is varied without affecting said setpoint of said pad valve.

17. A tank blanketing system as claimed in claim 11, wherein said depad pilot valve includes an adjustable portion for varying a setpoint of actuation of said pad valve.

18. A tank blanketing system as claimed in claim 17, wherein a deadband between a setpoint of said depad valve and said setpoint of said pad valve is varied without affecting said setpoint of said pad valve.

19. A tank blanketing system as claimed in claim 11, wherein a setpoint of said depad valve remains constant, independent of differential pressure across said depad valve.

* * * * *